(12) United States Patent
Kawasaki

(10) Patent No.: US 11,465,451 B2
(45) Date of Patent: Oct. 11, 2022

(54) TYRE

(71) Applicant: SUMITOMO RUBBER INDUSTRIES, LTD., Hyogo (JP)

(72) Inventor: Yuzo Kawasaki, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 737 days.

(21) Appl. No.: 16/292,628

(22) Filed: Mar. 5, 2019

(65) Prior Publication Data
US 2019/0291515 A1 Sep. 26, 2019

(30) Foreign Application Priority Data
Mar. 26, 2018 (JP) .............................. JP2018-058488

(51) Int. Cl.
*B60C 11/12* (2006.01)
*B60C 11/13* (2006.01)
*B60C 11/03* (2006.01)

(52) U.S. Cl.
CPC ...... *B60C 11/1236* (2013.01); *B60C 11/0306* (2013.01); *B60C 11/1204* (2013.01); *B60C 2011/0369* (2013.01); *B60C 2011/0381* (2013.01); *B60C 2011/0383* (2013.01);
(Continued)

(58) Field of Classification Search
CPC . B60C 11/12; B60C 11/1236; B60C 11/1268; B60C 11/1286; B60C 11/1204; B60C 11/1263; B60C 2011/1213; B60C 2011/0381
See application file for complete search history.

(56) References Cited

U.S. PATENT DOCUMENTS

| 4,412,576 A | 11/1983 | Nakajima |
| 6,003,575 A * | 12/1999 | Koyama .................. B60C 11/12 |
| | | 152/209.27 |
| 2018/0015789 A1* | 1/2018 | Horiguchi ........... B60C 11/1218 |

FOREIGN PATENT DOCUMENTS

| EP | 1685981 A1 | 8/2006 |
| EP | 3135504 A1 | 3/2017 |
| JP | S60-255506 | * 12/1985 |

(Continued)

OTHER PUBLICATIONS

English machine translation of JP S60-255506. (Year: 1985).*
(Continued)

*Primary Examiner* — Robert C Dye
(74) *Attorney, Agent, or Firm* — Greenblum & Bernstein, P.L.C.

(57) ABSTRACT

A tyre includes a tread portion including a first land portion having a circumferentially extending first edge and a circumferentially extending second edge on its ground contacting surface. The first land portion is provided with sipes each extending from the first edge to the second edge. The sipes include bent sipes each including two or more sipe elements joined with each other to form a bent portion. The bent sipes include first sipes and second sipes. Each first sipe, as the sipes elements, includes at least one first sipe element inclined in a first direction with respect to a tyre axial direction and at least one second sipe element inclined in a second direction opposite to the first direction with respect to the tyre axial direction. All sipe elements of each second sipe are inclined in the first direction with respect to the tyre axial direction.

18 Claims, 3 Drawing Sheets

(52) U.S. Cl.
CPC ............... *B60C 2011/0386* (2013.01); *B60C 2011/0388* (2013.01)

(56) References Cited

FOREIGN PATENT DOCUMENTS

| JP | H07-228108 | * | 8/1995 |
|---|---|---|---|
| JP | 2002-046426 | * | 2/2002 |
| JP | 2016-168991 | * | 9/2016 |
| JP | 2016-203703 A | | 12/2016 |
| WO | 9746359 A1 | | 12/1997 |

OTHER PUBLICATIONS

English machine translation of JP H07-228108. (Year: 1995).*
English machine translation of JP2002-046426. (Year: 2002).*
English machine translation of JP2016-168991. (Year: 2016).*
European Search Report, European patent Office, Application No. 19159792.1, dated Aug. 13, 2019, 9 pages.

* cited by examiner

TYRE

BACKGROUND ART

Field of the Disclosure

The present disclosure relates to a tyre capable of improving steering stability on dry roads and on-ice/snow performance in a well-balanced manner.

Description of the Related Art

Conventionally, tyres which are designed to improve steering stability on ice/snow roads (hereinafter, referred to as "on-ice/snow performance") have been proposed. For example, the following Patent document 1 discloses a tyre tread which comprises a land portion divided by circumferentially and continuously extending main grooves. The land portion is provided with a plurality of lug grooves extending from the main grooves and terminating within the land portion and a plurality of sipes.

Patent Document

[Patent document 1] JP2016-203703A1

SUMMARY OF THE DISCLOSURE

Unfortunately, since the tyre disclosed in Patent document 1 comprises sipes connecting lug grooves and sipes traversing the land portion completely, the stiffness of the land portion tends to decrease, and thus there still has been a room for improvement in steering stability on dry roads.

In view of the above problems in the conventional art, the present disclosure has an object to provide a tyre capable of improving steering stability on dry roads and on-ice/snow performance in a well-balanced manner.

According to one aspect of the disclosure, a tyre includes a tread portion including a first land portion having a circumferentially extending first edge and a circumferentially extending second edge on its ground contacting surface, the first land portion being provided with sipes each extending from the first edge to the second edge, the sipes including bent sipes each including two or more sipe elements joined with each other to form a bent portion, the bent sipes including first sipes and second sipes, each first sipe, as the sipes elements, including at least one first sipe element inclined in a first direction with respect to a tyre axial direction and at least one second sipe element inclined in a second direction opposite to the first direction with respect to the tyre axial direction, and all sipe elements of each second sipe inclined in the first direction with respect to the tyre axial direction.

In another aspect of the disclosure, the first sipes and the second sipes may be arranged alternately in a tyre circumferential direction.

In another aspect of the disclosure, at the first edge, a minimum distance in a tyre circumferential direction between one first sipe and one second sipe adjacent to said one first sipe may be in a range of from 30% to 48% of a distance in the tyre circumferential direction between adjacent second sipes.

In another aspect of the disclosure, the at least one first sipe element of each first sipe may include two first sipe elements constituting respective end portions in the tyre axial direction of each first sipe, and the at least one second sipe element constituting a middle portion in the tyre axial direction of each first sipe.

In another aspect of the disclosure, each first sipe may include at least one third sipe element connecting the at least one first sipe element and the at least one second sipe element.

In another aspect of the disclosure, the at least one third sipe element may be inclined in the first direction with respect to the tyre axial direction.

In another aspect of the disclosure, an angle between the at least one second sipe element and the at least one third sipe element may be in a range of from 90 to 100 degrees.

In another aspect of the disclosure, each second sipe, as the sipe elements, may include two fourth sipe elements constituting respective end portions in the tyre axial direction of each second sipe and a fifth sipe element constituting a middle portion in the tyre axial direction of each second sipe.

In another aspect of the disclosure, an angle of the fifth sipe element with respect to the tyre axial direction may be greater than angles of the fourth sipe elements with respect to the tyre axial direction.

In another aspect of the disclosure, the first land portion may further be provided with at least one third sipe extending from the first edge and terminating within the first land portion and a fourth sipe extending from the second edge and terminating within the first land portion, wherein the at least one third sipe and the at least one fourth sipe may be inclined in the first direction with respect to the tyre axial direction.

In another aspect of the disclosure, the at least one third sipe or the at least one fourth sipe may be arranged on an extension line of the at least one third sipe element.

In another aspect of the disclosure, at the first edge, a minimum distance in a tyre circumferential direction between the at least one third sipe and one second sipe adjacent to the at least one third sipe may be in a range of from 30% to 48% of a distance in the tyre circumferential direction between adjacent second sipes.

In another aspect of the disclosure, the first land portion may be arranged such that a tyre equator is located thereon.

In another aspect of the disclosure, the at least one second sipe element may be shallower than the at least one first sipe element.

In another aspect of the disclosure, the at least one third sipe element may be shallower than the at least one first sipe element and deeper than the at least one second sipe element.

In another aspect of the disclosure, the tread portion may further include a middle land portion defined between a crown longitudinal groove and a shoulder longitudinal groove, and the middle land portion being adjacent to the first land portion through the crown longitudinal groove, wherein the middle land portion may be provided with first middle lateral grooves extending from the crown longitudinal groove and terminating within the middle land portion and second middle lateral grooves extending from the shoulder longitudinal groove and terminating within the middle land portion, and the first middle lateral grooves and the second middle lateral grooves may be inclined in the second direction with respect to the tyre axial direction.

In another aspect of the disclosure, each first middle lateral groove may have a length in the tyre axial direction longer than a length in the tyre axial direction of each the second middle lateral grooves, and the length of each first middle lateral groove and the length of each second middle lateral groove may be more than 50% of an axial width of the middle land portion.

In another aspect of the disclosure, each first middle lateral groove may include a first middle element opened at the crown longitudinal groove, a second middle element having a terminal end on the middle land portion, and a third middle element connecting the first middle element and the second middle element, the second middle element may be shallower than the first middle element, and the third middle element may have a depth gradually varying from a depth of the first middle element to a depth of the second middle element.

In another aspect of the disclosure, the first land portion may be provided with recesses which are opened at the crown longitudinal groove and which extend inwardly in a width direction of the first land portion, and the first middle lateral grooves may be arranged such that opening ends of the first middle lateral grooves to the crown longitudinal groove face the recesses in the tyre axial direction.

In another aspect of the disclosure, the tread portion further including a shoulder land portion defined between the shoulder longitudinal groove and a tread edge, wherein the shoulder land portion may be provided with shoulder lateral grooves extending axially inwardly from the tread edge and shoulder sipes extending axially inwardly from the tread edge, the shoulder lateral grooves may include first shoulder lateral grooves extending to the shoulder longitudinal groove and second shoulder lateral grooves terminating within the shoulder land portion, each first shoulder lateral groove may include a first shoulder element extending from the tread edge the first shoulder element and a second shoulder element connecting the first shoulder element and the shoulder longitudinal groove, and the second shoulder element may be shallower than the first shoulder element.

DESCRIPTION OF THE PREFERRED EMBODIMENTS

Figure 1:
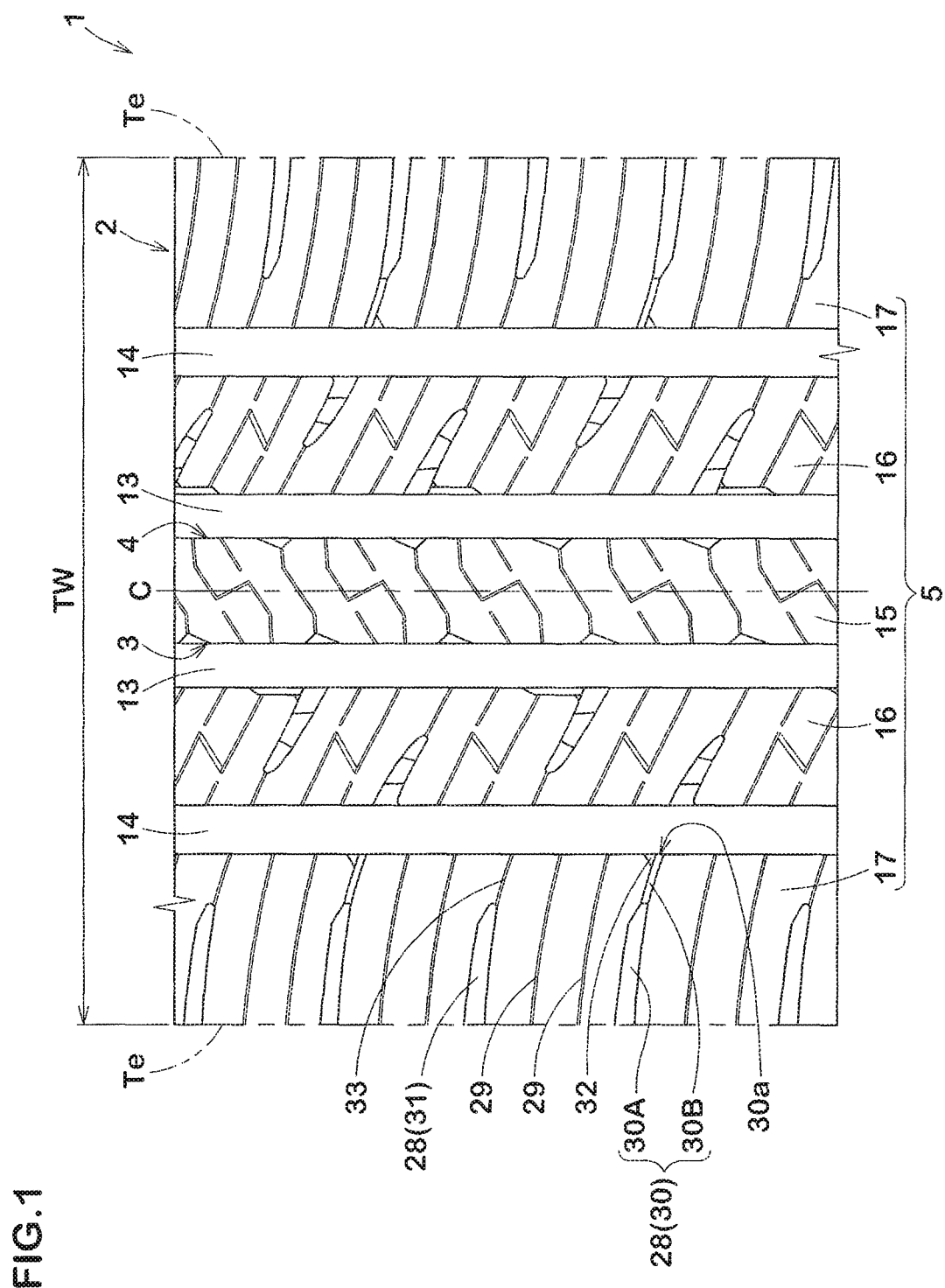
FIG. 1 is a development view of a tread portion of a tyre in accordance with an embodiment of the present disclosure.

An embodiment of the present disclosure will be explained below with reference to the accompanying drawings. FIG. 1 illustrates a development view of a tread portion 2 of a tyre 1 according to an embodiment. The tyre 1 according to the embodiment, for example, can be used for various tyres, e.g., pneumatic tyres for passenger car and heavy-duty vehicle, and non-pneumatic tyres that can support the tyre load by structural members without being inflated with pressurized air. Preferably, the tyre 1 according to the embodiment, for example, is embodied as a passenger car tyre.

As illustrated in FIG. 1, the tyre 1 according to the embodiment includes the tread portion 2 which comes into contact with the ground when traveling. Preferably, the tread portion 2 includes land portions 5 which include a first land portion 15 having a circumferentially extending first edge 3 and a circumferentially extending second edge 4 on its ground contacting surface.

Figure 2:
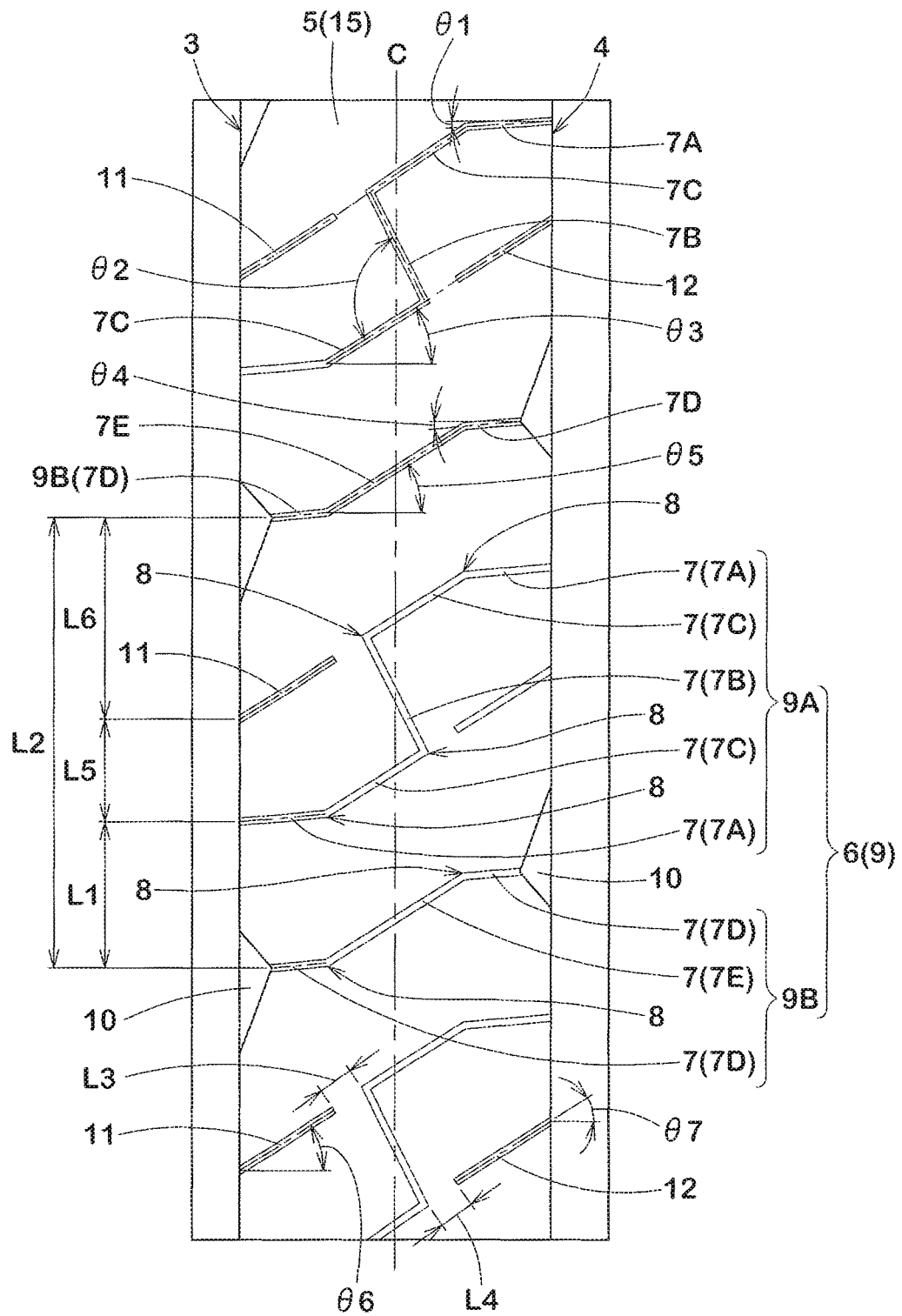
FIG. 2 is an enlarged view of a first and portion (crown land portion)

FIG. 2 illustrates an enlarged view of the first land portion 15. As illustrated in FIG. 2, the first land portion 15 is preferably provided with sipes 6 each extending from the first edge 3 to the second edge 4. Such a first land portion 15, due to the sipes 6, can enhance edge effect, improving on-ice/snow performance of the tyre 1.

In this embodiment, the sipes 6 include bent sipes 9 each including two or more sipe elements 7 joined with each other so as to form at least one bent portion 8. Such a first land portion 15 can enhance edge effect in both tyre circumferential direction and tyre axial direction by the bent sipes 9, improving on-ice/snow performance of the tyre 1 further. The bent sipes 9, for example, include first sipes 9A and second sipes 9B. The bent sipes 9 can optimize a stiffness distribution in the first land portion 15, helping to improve steering stability of the tyre 1 on dry roads.

In this embodiment, as the sipe elements 7, each first sipe 9A includes first sipe elements 7A inclined in a first direction with respect to the tyre axial direction and a second sipe element 7B inclined in a second direction opposite to the first direction with respect to the tyre axial direction. Such a first sipe 9A having the first sipe elements 7A and the second sipe element 7B can increase the stiffness of the first land portion, and thus steering stability of the tyre 1 on dry roads can be improved. Further, the first sipes 9A can ensure the edge effect in the tyre circumferential direction and the lyre axial direction in a well-balanced manner.

In this embodiment, all sipe elements 7 included in each second sipe 9B are inclined in the first direction with respect to the tyre axial direction. That is, each second sipe 9B consists of sipe elements 7 which are inclined in the first direction. Such a second sipe 9B improves especially the edge effect in the tyre axial direction. Thus, the tyre 1 according to the embodiment which includes the bent sipes 9 including the first sipes 9A and the second sipes 9B can improve steering stability on dry roads and on-ice/snow performance in a well-balanced manner.

In this embodiment, the first land portion 15 is provided with recesses 10 which extend inwardly in a width direction of the first land portion 15 from the first edge 3 and the second edge 4. Each second sipes 9B, for example, extends to connect two recesses, i.e., connecting one recess 10 on the first edge 3 with another recess 10 on the second edge 4. Such a second sipe 9B can improve on-ice/snow performance of the tyre 1 in cooperation with the recesses 10. Preferably, the first sipes 9A and the second sipes 9B are arranged alternately in the tyre circumferential direction. Such bent sipes 9 can optimize a stiffness distribution in the first land portion 15, helping to improve steering stability of the tyre 1 on dry roads.

At the first edge 3, a minimum distance L1 in the tyre circumferential direction between one first sipe 9A and one second sipe 9B adjacent to the first sipe 9A is in a range of from 30% to 48% of a distance L2 in the tyre circumferential direction between adjacent second sipes 9B. In such an arrangement of sipes, the first sipes 9A and the second sipes 9B are in cooperation with each other to exhibit an excellent edge effect while ensuring sufficient stiffness in the first land portion 15. In this embodiment, at the first edge 3, the locations of second sipes 9B in the tyre circumferential direction are locations where the second sipes 9B open at the recesses 10.

In this application including specification and claims, various dimensions, positions and the like of the tyre 1 refer to those under a standard condition of the tyre 1 unless otherwise noted. In addition, lengths and distances of portions of the tyre 1 refer to lengths and distances of the portions of a radially outermost surface of the tread portion 2. As used herein, the standard condition is such that the tyre 1 is mounted on a standard wheel rim R and inflated to a standard pressure but loaded with no tyre load.

As used herein, the standard wheel rim is a wheel rim officially approved or recommended for the tyre 1 by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tyre 1 by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

In this embodiment, each first sipe 9A is configured to have two first sipe elements 7A which constitute respective end portions in the tyre axial direction of each first sipe 9A and one second sipe element 7B which constitutes a middle portion in the tyre axial direction of each first sipe 9A. Preferably, each first sipe 9A includes two third sipe elements 7C each of which connects the second sipe element 7B and a respective one of the first sipe elements 7A.

In this embodiment, the third sipe elements 7C are inclined in the first direction. Preferably, angles $\theta 3$ of the third sipe elements 7C with respect to the tyre axial direction are greater than angles $\theta 1$ of the first sipe elements 7A with respect to the tyre axial direction. The angles $\theta 3$ of the third sipe elements 7C are preferably in a range of from 45 to 65 degrees with respect to the tyre axial direction. More preferably, an angle $\theta 2$ formed between the second sipe element 7B and one of the third sipe elements 7C is in a range of from 90 to 100 degrees. Such a first sipe 9A, when driving on ice/snow roads, can ensure the edge effect in both tyre circumferential direction and tyre axial direction in a well-balanced manner, improving on-ice/snow performance of the tyre 1.

Preferably, the second sipe element 7B is shallower than the first sipe elements 7A. The third sipe elements 7C, for example, are shallower than the first sipe elements 7A and deeper than the second sipe element 7B. Such a first sipe 9A has a depth which is not constant, suppressing reduction in stiffness of the first land portion 15 to improve steering stability of the tyre 1 on dry roads.

In this embodiment, each second sipe 9B, as the sipe elements 7, includes two fourth sipe elements 7D which constitute respective end portions in the tyre axial direction of each second sipe 9B and a fifth sipe element 7E which constitute a middle portion in the tyre axial direction of each second sipe 9B. Preferably, an angle $\theta 5$ of the fifth sipe element 7E with respect to the tyre axial direction is greater than angles $\theta 4$ of the fourth sipe elements 7D with respect to the tyre axial direction. Such a second sipe 9B can ensure a high edge effect in the tyre circumferential direction, improving on-ice/snow performance of the tyre 1.

Preferably, the fifth sipe element 7E is shallower than the fourth sipe elements 7D. The fourth sipe elements 7D, for example, have the same depth as that of the first sipe elements 7A. In addition, the fifth sipe element 7E, for example, has the same depth as the third sipe elements 7C. Such a second sipe 9B has a depth which is not constant, suppressing reduction in stiffness of the first land portion 15 to improve steering stability of the tyre 1 on dry roads.

In this embodiment, the first land portion 15 is further provided with third sipes 11 which extend from the first edge 3 and terminating within the first land portion 15 and fourth sipes 12 which extend from the second edge 4 and terminating within the first land portion 15. Preferably, the third sipe 11 and the fourth sipes 12 are inclined in the first direction with respect to the tyre axial direction.

Preferably, at least one third sipe 11 or at least one fourth sipe 12 may be arranged on an extension line of at least one third sipe element 7C. In this embodiment, the third sipes 11 and the fourth sipes 12 are arranged on extension lines of the respective third sipe elements 7C.

Preferably, a minimum distance L3 between the adjacent third sipes 11 and the third sipe element 7C is in a range of from 2 to 4 mm. Further, a minimum distance L4 between one fourth sipe 12 and one third sipe element 7C adjacent to the fourth sipe 12 is in a range of from 2 to 4 mm. The minimum distances L3 and L4 are preferably equal with each other. Such third sipes 11 and fourth sipes 12 can ensure a high edge effect in the tyre circumferential direction, improving steering stability on dry roads and on-ice/snow performance of the tyre 1 in a well-balanced manner while suppressing reduction in stiffness of the first land portion 15.

At the first edge 3, a minimum distance L5 in the tyre circumferential direction between one first sipe 9A and one third sipe 11 adjacent to the first sipe 9A is preferably in a range of from 20% to 40% of the distance L2 in the tyre circumferential direction between adjacent second sipes 9B. Thus, the first sipes 9A and the third sipes 11 are in cooperation with each other to improve the edge effect while ensuring sufficient stiffness of the first land portion 15.

At the first edge 3, a minimum distance L6 in a tyre circumferential direction between one second sipe 9B and one third sipe 11 adjacent to the second sipe 9B is preferably in a range of from 30% to 48% of the distance L2 in the tyre circumferential direction between adjacent second sipes 9B. Thus, the second sipes 9B and the third sipes 11 are in cooperation with each other to improve the edge effect while ensuring sufficient stiffness of the first land portion 15.

Preferably, the fourth sipes 12 have depths which are the same as that of the third sipes 11. In this embodiment, the third sipes 11 and the fourth sipes 12 have depths which are the same as that of the first sipe elements 7A. The third sipes 11 and the fourth sipes 12 may be helpful to optimize stiffness of the first land portion 15 with respect to the tyre axial direction in a well-balanced manner, improving steering stability of the tyre 1 on dry roads.

As illustrated in FIG. 1, the tread portion 2 according to the embodiment is further provided with circumferentially extending two crown longitudinal grooves 13 arranged such that the tyre equator C is located therebetween and circumferentially extending two shoulder longitudinal grooves 14 arranged between the crown longitudinal grooves 13 and tread edges Te.

As used herein, the tread edges Te, when the tyre 1 is a pneumatic tyre, refer to axially outermost edges of the ground contacting patch of the tread portion 2 which occurs under a standard loaded condition when the camber angle of the tyre 1 is zero. Here, the standard loaded condition is such that the tyre 1 is mounted on the standard wheel rim and inflated to the standard pressure and loaded with a standard tyre load. The central location in the tyre axial direction between the tread edges Te corresponds to the tyre equator C.

As used herein, the standard tyre load is a tyre load officially approved or recommended for the tyre 1 by standards organizations, wherein the standard load is the "maximum load capacity" in JATMA, the "Load Capacity" in ETRTO, and the maximum value given in the above-mentioned table in TRA or the like.

The crown longitudinal grooves 13 and the shoulder longitudinal grooves 14, for example, have groove widths equal to or more than 2% of the tread width TW. Here, the tread width TW is a distance in the tyre axial direction between the tread edges Te under the standard condition.

In this embodiment, the tread portion 2 includes the first land portion 15 which is divided by the crown longitudinal grooves 13 to form a crown land portion 15, a pair of middle land portions 16 defined by the crown longitudinal grooves 13 and the shoulder longitudinal grooves 14, and a pair of shoulder land portions 17 defined between the tread edges Te and the shoulder longitudinal grooves 14.

As illustrated in FIG. 1 and FIG. 2, in this embodiment, the first land portion 15 having the first edge 3 and the second edge 4 is arranged on the tyre equator C. Thus, the crown land portion according to the embodiment is provided with the above-mentioned first sipes 9A, second sipes 9B, third sipes 11 and fourth sipes 12.

As illustrated in FIG. 2, the second sipe elements 7B of the first sipes 9A preferably traverse the tyre equator C. In the first sipes 9A according to the embodiment, the second sipe elements 7B as well as the third sipe elements 7C traverse the tyre equator C. Thus, the first sipes 9A can be helpful to optimize the stiffness of the first land portion 15 with respect to the tyre axial direction in a well-balanced manner, improving steering stability of the tyre 1 on dry roads.

Figure 3:
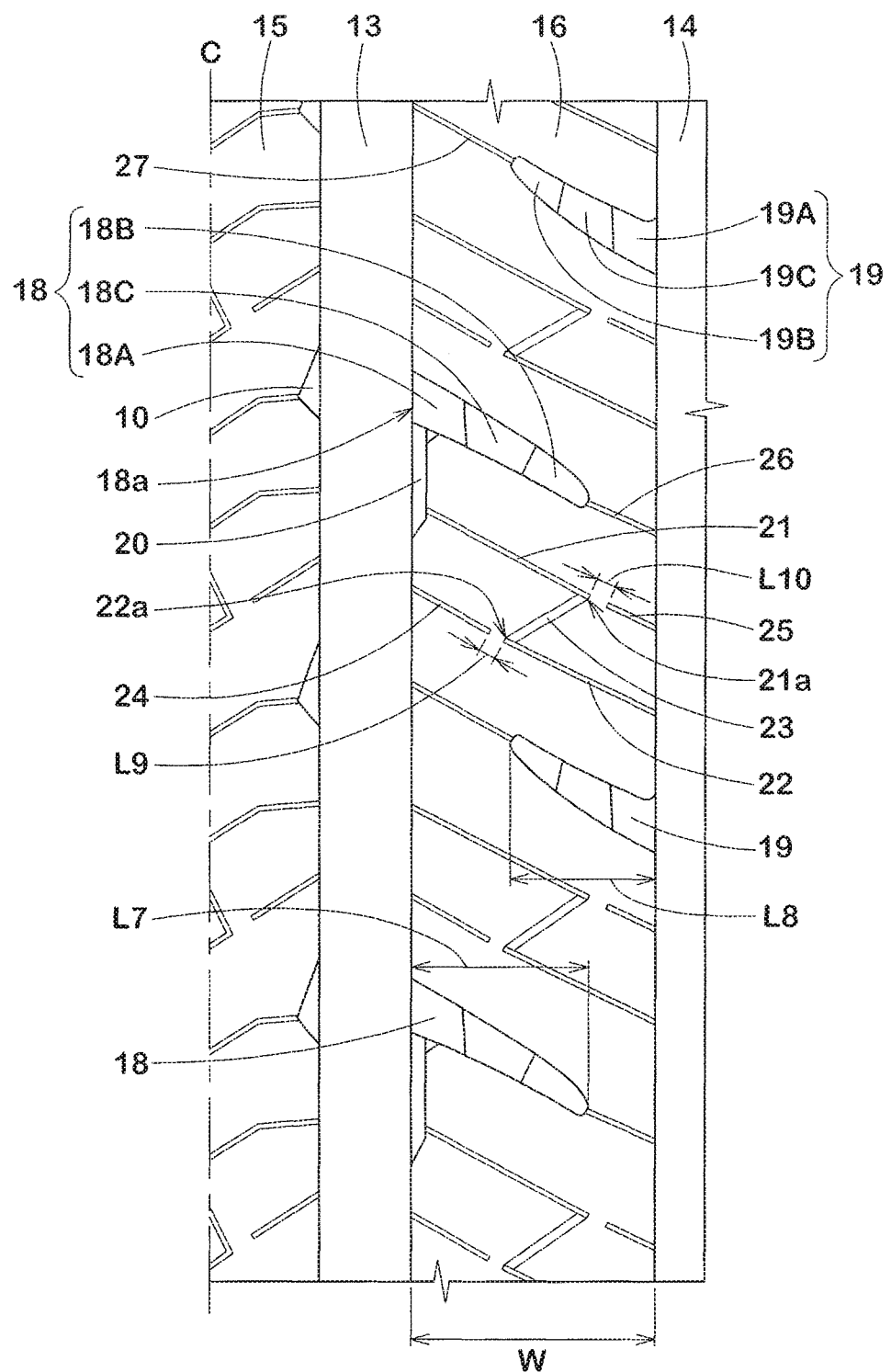
FIG. 3 is an enlarged view of a middle land portion.

FIG. 3 illustrates an enlarged view of one middle land portion 16. As illustrated in FIG. 3, each middle land portion 16 is provided with first middle lateral grooves 18 extending from the crown longitudinal groove 13 and second middle lateral grooves 19 extending from the shoulder longitudinal groove 14. The first middle lateral grooves 18, as well as the second middle lateral grooves 19, are inclined in the second direction (i.e., an opposite direction to the first direction) with respect to the tyre axial direction, and preferably terminate within the middle land portion 16.

In this embodiment, each first middle lateral groove 18 has a length L7 in the tyre axial direction is longer than a length L8 in the tyre axial direction of each the second middle lateral grooves 19. Preferably, the length L7 of each first middle lateral groove 18 and the length L8 of each second middle lateral groove 19 are more than 50% of an axial width W of the middle land portion 16. Thus, the first middle lateral grooves 18 and the second middle lateral grooves 19 can form compressed snow columns therein and shear them to generate powerful snow traction, improving on-ice/snow performance of the tyre 1.

Each first middle lateral groove 18, for example, includes a first middle element 18A opened at the crown longitudinal groove 13, a second middle element 18B having a terminal end on the middle land portion 16, and a third middle element 18C connecting the first middle element 18A and the second middle element 18B. Preferably, the second middle element 18B is configured to have a depth shallower than that of the first middle element 18A. In this embodiment, the third middle element 18C has a depth gradually varying from a depth of the first middle element 18A to the depth of the second middle element 18B. The first middle lateral grooves 18, while ensuring sufficient stiffness of the middle land portions 16, exert powerful snow-shearing force, improving steering stability of the tyre 1 on dry roads and on-ice/snow performance.

The middle land portion 16 is further provided with chamfer portions 20 which are connected to opening ends 18a of the respective first middle lateral grooves 18 that are opened to the crown longitudinal groove 13, for example. In this embodiment, the opening ends 18a of the first middle lateral grooves 18 face the recesses 10 provided on the crown land portion 15 in the tyre axial direction through the crown longitudinal groove 13. Such first middle lateral grooves 18 are in cooperation with the crown longitudinal groove 13 and the recesses 10 to improve on-ice/snow performance.

Each second middle lateral groove 19, for example, includes a fourth middle element 19A opened at the shoulder longitudinal groove 14, a fifth middle element 19B having a terminal end on the middle land portion 16, and a sixth middle element 19C connecting the fourth middle element 19A and the fifth middle element 19B. Preferably, the fifth middle element 19B is configured to have a depth shallower than that of the fourth middle element 19A. In this embodiment, the sixth middle element 19C has a depth gradually varying from a depth of the fourth middle element 19A to the depth of the fifth middle element 19B. The second middle lateral grooves 19, while ensuring sufficient stiffness of the middle land portions 16, exert powerful snow-shearing force, improving steering stability of the tyre 1 on dry roads and on-ice/snow performance.

In this embodiment, each middle land portion 16 is further provided with first middle sipes 21 which extend from the crown longitudinal groove 13 and terminating within the middle land portion 16 and second middle sipes 22 which extend from the shoulder longitudinal groove 14 and terminating within the middle land portion 16. The first middle sipes 21 and the second middle sipe 22 are preferably inclined in the second direction with respect to the tyre axial direction (i.e., an opposite direction to the first direction). In this embodiment, the first middle sipes 21 and the second middle sipe 22 are parallel with one another. The first middle sipes 21 and the second middle sipe 22 are in cooperation with one another to exert a superior edge effect, improving on-ice/snow performance of the tyre 1.

Preferably, each middle land portion 16 is further provided with middle narrow grooves 23 connecting the first middle sipes 21 and the second middle sipe 22. Each middle narrow groove 23, for example, connects an inner terminal end 21a in a width direction of the middle land portion 16 of one first middle sipe 21 and an inner terminal end 22a in the width direction of the middle land portion 16 of one second middle sipe 22. The middle narrow grooves 23 are preferably inclined in the first direction with respect to the tyre axial direction. Such middle narrow grooves 23 are in cooperation with the first middle sipes 21 and the second middle sipe 22 to exert a superior edge effect in both tyre circumferential direction and tyre axial direction in a well-balanced manner, improving on-ice/snow performance of the tyre 1.

Preferably, each middle land portion 16 is further provided with third middle sipes 24 which extend from the crown longitudinal groove 13 and terminating within the middle land portion 16 and fourth middle sipes 25 which extend from the shoulder longitudinal groove 14 and terminating within the middle land portion 16. In this embodiment, a terminal end of each of third and fourth sipes is not connected to any other sipes nor grooves.

In this embodiment, the third middle sipes 24 are arranged on extension lines of the second middle sipes 22. Preferably, a minimum distance L9 between one third middle sipe 24 and one second middle sipe 22 adjacent to the third middle sipe 24 is in a range of 2 to 4 mm. Further, the fourth middle sipes 25 according to the embodiment are arranged on extension lines of the first middle sipes 21. Preferably, a minimum distance L10 between one fourth middle sipe 25 and one first middle sipe 21 adjacent to the fourth middle sipe 25 is in a range of from 2 to 4 mm. The minimum distances L9 and L10 are preferably equal with each other. Thus, the third middle sipes 24 and the fourth middle sipes 25, are in cooperation with the second middle sipes 22 and the first middle sipes 21 to exert a superior edge effect without deteriorating the middle land portions 16 in stiffness.

Preferably, each middle land portion 16 is further provided with fifth middle sipes 26 which connect the first middle lateral grooves 18 and the shoulder longitudinal groove 14, and sixth middle sipes 27 which connect the second middle lateral grooves 19 and the crown longitudinal groove 13. The fifth middle sipes 26 and the sixth middle sipes 27 can exert the edge effect while ensuring sufficient stiffness of the middle land portion 16, improving on-ice/snow performance.

As illustrated in FIG. 1, in this embodiment, each shoulder land portion 17 is provided with shoulder lateral grooves 28 extending axially inwardly from the tread edge Te and first shoulder sipes 29 extending axially inwardly from the tread edge Te.

The shoulder lateral grooves 28, for example, include first shoulder lateral grooves 30 which extend from the tread edge Te to the shoulder longitudinal groove 14 and second shoulder lateral grooves 31 which terminate within the shoulder land portion 17. Such shoulder lateral grooves 28 can compress snow in their voids and then shear to generate powerful snow traction, improving on-ice/snow performance of the tyre 1.

In this embodiment, each first shoulder lateral grooves 30 includes a first shoulder element 30A extending from the tread edge Te and a second shoulder element 30B connecting the first shoulder element 30A and the shoulder longitudinal groove 14. Preferably, a groove width of the second shoulder element 30B is narrower than that of the first shoulder element 30A. Preferably, each shoulder land portion 17 is further provided with chamfer portions 32 each arranged a corner formed between one first shoulder lateral groove 30 and the shoulder longitudinal groove 14 on the ground contact surface, for example. The chamfer portion 32 is in communication with an opening 30a of the first shoulder lateral groove 30. Such first shoulder lateral grooves 30 are in cooperation with the shoulder longitudinal groove 14 to improve on-ice/snow performance of the tyre 1.

Preferably, the first shoulder lateral grooves 30 and the second shoulder lateral grooves 31 are arranged alternately in the tyre circumferential direction. Such shoulder land portions 17 having the first shoulder lateral grooves 30 and the second shoulder lateral grooves 31 have well-balanced stiffness distribution, improving durability of the tyre 1.

In this embodiment, each first shoulder sipes 29 extends from the tread edge Te to the shoulder longitudinal groove 14. One or more first shoulder sipes (two in this embodiment) 29 are arranged between one first shoulder lateral groove 30 and one second shoulder lateral groove 31 adjacent to the first shoulder lateral groove 30. Such first shoulder sipes 29, while ensuring high stiffness of the shoulder land portions 17, exert better edge effect to improve on-ice/snow performance of the tyre 1.

In this embodiment, each shoulder land portion 17 is further provided with second shoulder sipes 33 connecting the second shoulder lateral grooves 31 and the shoulder longitudinal groove 14. Such second shoulder sipes 33, while ensuring high stiffness of the shoulder land portions 17, exert better edge effect to improve on-ice/snow performance of the tyre 1.

While the particularly preferable embodiments in accordance with the present disclosure have been described in detail, the present disclosure is not limited to the illustrated embodiments, but can be modified and carried out in various aspects.

Example

Tyres having a basic tread pattern shown in FIG. 1 were prototyped based on the detail shown in Table 1. Then, steering stability and on-ice/snow performance of each test tyres was tested. The common specification and the testing methods for the test tyres are as follows:
Tyre size: 215/60R16
Rim size: 16×6.5J
Tyre inner pressure: 240 kPa
test vehicle: mid-size FF passenger car
Tyre location: all wheels
Steering Stability Test:
A test driver drove the test vehicle to which each test tyre was attached on a dry road to evaluate the steering stability by the driver's sense. The test results are shown in Table 1 using an index where Ref. 1 is set to 100. The larger value indicates better the steering stability.
On-Ice/Snow Performance Test:
A test driver drove the test vehicle to which each test tyre was attached on ice/snow roads to evaluate the steering stability by the driver's sense. The test results are shown in Table 1 using an index where Ref. 1 is set to 100. The larger value indicates better the on-ice/snow performance.
Tables 1 and 2 show the test results.

TABLE 1

|  | Ref. 1 | Ex. 1 | Ex. 2 | Ex. 3 | Ex. 4 | Ex. 5 | Ex. 6 | Ex. 7 |
| --- | --- | --- | --- | --- | --- | --- | --- | --- |
| First sipes and second sipes | second sipes only | presence | presence | presence | presence | presence | presence | presence |
| Third sipes and fourth sipes | presence | presence | none | presence | presence | presence | presence | presence |
| Angle between second sipe element and third sipe element (deg.) | — | 95 | 95 | 80 | 90 | 100 | 110 | 95 |
| Minimum distance L1 between first sipes and second sipes/distance L2 between second sipes (%) | — | 32 | 32 | 32 | 32 | 32 | 32 | 18 |
| Minimum distance L6 between second sipes and third sipes/distance L2 between second sipes (%) | 45 | 45 | — | 45 | 45 | 45 | 45 | 60 |
| Minimum distance L3 between third sipes and third sipe elements (mm) | 3 | 3 | — | 3 | 3 | 3 | 3 | 3 |
| Steering stability (index) | 100 | 103 | 101 | 98 | 100 | 104 | 98 | 98 |
| On-ice performance (index) | 100 | 112 | 102 | 112 | 114 | 109 | 106 | 112 |

TABLE 2

|  | Ex. 8 | Ex. 9 | Ex. 10 | Ex. 11 | Ex. 12 | Ex. 13 | Ex. 14 | Ex. 15 |
| --- | --- | --- | --- | --- | --- | --- | --- | --- |
| First sipes and second sipes | presence | presence | presence | presence | presence | presence | presence | presence |
| Third sipes and fourth sipes | presence | presence | presence | presence | presence | presence | presence | presence |
| Angle between second sipe element and third sipe element (deg.) | 95 | 95 | 95 | 95 | 95 | 95 | 95 | 95 |
| Minimum distance L1 between first sipes and second sipes/distance L2 between second sipes (%) | 30 | 48 | 58 | 20 | 32 | 32 | 32 | 32 |
| Minimum distance L6 between second sipes and third sipes/distance L2 between second sipes (%) | 48 | 30 | 20 | 20 | 45 | 45 | 45 | 45 |
| Minimum distance L3 between third sipes and third sipe elements (mm) | 3 | 3 | 3 | 3 | 1 | 2 | 4 | 5 |
| Steering stability (index) | 103 | 103 | 98 | 93 | 98 | 99 | 105 | 105 |
| On-ice performance (index) | 112 | 112 | 112 | 114 | 112 | 115 | 109 | 106 |

From the test results, it is confirmed that the example tyres, as compared with the comparative examples, improve steering stability on dry roads and on-ice/snow performance in a well-balanced manner.

What is claimed is:

1. A tyre comprising:
  a tread portion comprising
    a first land portion having a circumferentially extending first edge and a circumferentially extending second edge on its ground contacting surface, the first land portion being arranged such that a tyre equator is located thereon, and
    a middle land portion defined between a crown longitudinal groove and a shoulder longitudinal groove, the middle land portion being adjacent to the first land portion through the crown longitudinal groove;
  the first land portion being provided with sipes each extending from the first edge to the second edge;
  the sipes comprising bent sipes each comprising two or more sipe elements joined with each other to form a bent portion;
  the bent sipes comprising first sipes and second sipes;
  each first sipe, as the sipes elements, comprising at least one first sipe element inclined in a first direction with respect to a tyre axial direction and at least one second sipe element inclined in a second direction opposite to the first direction with respect to the tyre axial direction; and
  all sipe elements of each second sipe inclined in the first direction with respect to the tyre axial direction,
  wherein
  the middle land portion is provided with first middle lateral grooves extending from the crown longitudinal groove and terminating within the middle land portion and second middle lateral grooves extending from the shoulder longitudinal groove and terminating within the middle land portion, and
  the first middle lateral grooves and the second middle lateral grooves are inclined in the second direction with respect to the tyre axial direction.

2. The tyre according to claim 1, wherein
the first sipes and the second sipes are arranged alternately in a tyre circumferential direction.

3. The tyre according to claim 1, wherein
at the first edge, a minimum distance in a tyre circumferential direction between one first sipe and one second sipe adjacent to said one first sipe is in a range of from 30% to 48% of a distance in the tyre circumferential direction between adjacent second sipes.

4. The tyre according to claim 1, wherein
the at least one first sipe element of each first sipe comprises two first sipe elements constituting respective end portions in the tyre axial direction of each first sipe, and
the at least one second sipe element constituting a middle portion in the tyre axial direction of each first sipe.

5. The tyre according to claim 1, wherein
each first sipe comprises at least one third sipe element connecting the at least one first sipe element and the at least one second sipe element.

6. The tyre according to claim 5, wherein
the at least one third sipe element is inclined in the first direction with respect to the tyre axial direction.

7. The tyre according to claim 5, wherein
an angle between the at least one second sipe element and the at least one third sipe element is in a range of from 90 to 100 degrees.

8. The tyre according to claim 5,
the first land portion being further provided with at least one third sipe extending from the first edge and terminating within the first land portion and at least one fourth sipe extending from the second edge and terminating within the first land portion, wherein
the at least one third sipe or the at least one fourth sipe is arranged on an extension line of the at least one third sipe element.

9. The tyre according to claim 5, wherein
the at least one third sipe element is shallower than the at least one first sipe element and deeper than the at least one second sipe element.

10. The tyre according to claim 1, wherein
each second sipe, as the sipe elements, comprises two fourth sipe elements constituting respective end portions in the tyre axial direction of each second sipe and a fifth sipe element constituting a middle portion in the tyre axial direction of each second sipe.

11. The tyre according to claim 10, wherein
an angle of the fifth sipe element with respect to the tyre axial direction is greater than angles of the fourth sipe elements with respect to the tyre axial direction.

12. The tyre according to claim 1,
the first land portion being further provided with at least one third sipe extending from the first edge and terminating within the first land portion and at least one fourth sipe extending from the second edge and terminating within the first land portion, wherein
the at least one third sipe and the at least one fourth sipe are inclined in the first direction with respect to the tyre axial direction.

13. The tyre according to claim 12, wherein
at the first edge, a minimum distance in a tyre circumferential direction between the at least one third sipe and one second sipe adjacent to the at least one third sipe is in a range of from 30% to 48% of a distance in the tyre circumferential direction between adjacent second sipes.

14. The tyre according to claim 1, wherein
the at least one second sipe element is shallower than the at least one first sipe element.

15. The tyre according to claim 1, wherein
each first middle lateral groove has a length in the tyre axial direction longer than a length in the tyre axial direction of each the second middle lateral grooves, and
the length of each first middle lateral groove and the length of each second middle lateral groove are more than 50% of an axial width of the middle land portion.

16. The tyre according to claim 1, wherein
each first middle lateral groove comprises a first middle element opened at the crown longitudinal groove, a second middle element having a terminal end on the middle land portion, and a third middle element connecting the first middle element and the second middle element,
the second middle element is shallower than the first middle element, and
the third middle element has a depth gradually varying from a depth of the first middle element to a depth of the second middle element.

17. The tyre according to claim 1, wherein
the first land portion is provided with recesses which are opened at the crown longitudinal groove and which extend inwardly in a width direction of the first land portion, and
the first middle lateral grooves are arranged such that opening ends of the first middle lateral grooves to the crown longitudinal groove face the recesses in the tyre axial direction.

18. The tyre according to claim 1,
the tread portion further comprising a shoulder land portion defined between the shoulder longitudinal groove and a tread edge, wherein
the shoulder land portion is provided with shoulder lateral grooves extending axially inwardly from the tread edge and shoulder sipes extending axially inwardly from the tread edge,
the shoulder lateral grooves comprise first shoulder lateral grooves extending to the shoulder longitudinal groove and second shoulder lateral grooves terminating within the shoulder land portion,
each first shoulder lateral groove comprises a first shoulder element extending from the tread edge the first shoulder element and a second shoulder element connecting the first shoulder element and the shoulder longitudinal groove, and
the second shoulder element is shallower than the first shoulder element.

* * * * *